(12) United States Patent
Yamagishi et al.

(10) Patent No.: US 6,192,120 B1
(45) Date of Patent: Feb. 20, 2001

(54) METHOD AND APPARATUS FOR CONTROLLING CALL WAITING SERVICE

(75) Inventors: Masahiko Yamagishi; Wataru Oomori, both of Sendai (JP)

(73) Assignee: Fujitsu Limited, Kawasaki (JP)

( * ) Notice: Under 35 U.S.C. 154(b), the term of this patent shall be extended for 0 days.

(21) Appl. No.: 09/131,443

(22) Filed: Aug. 10, 1998

(30) Foreign Application Priority Data

Mar. 18, 1998 (JP) ................................................. 10-068712

(51) Int. Cl.$^7$ ...................................................... H04M 3/42
(52) U.S. Cl. .......................... 379/215; 379/201; 379/209; 379/210
(58) Field of Search ................... 379/67.1, 142, 379/201, 210, 215, 209, 271

(56) References Cited

U.S. PATENT DOCUMENTS

| | | | |
|---|---|---|---|
| 5,185,782 | * 2/1993 | Srinivasan | 379/67.1 |
| 5,311,574 | * 5/1994 | Livanos | 379/88 |
| 5,311,583 | * 5/1994 | Friedes et al. | 379/209 |
| 5,680,447 | * 10/1997 | Diamond et al. | 379/215 |
| 5,761,289 | * 6/1998 | Keshav | 379/201 |
| 5,784,448 | * 7/1998 | Yaker | 379/215 |
| 5,836,009 | * 11/1998 | Diamond et al. | 379/93.23 |
| 5,894,504 | * 4/1999 | Alfred et al. | 379/88.13 |
| 5,974,131 | * 10/1999 | Malik | 379/215 |

FOREIGN PATENT DOCUMENTS

| | | |
|---|---|---|
| 5-22469 | 1/1993 | (JP) . |
| 5-327891 | 12/1993 | (JP) . |

* cited by examiner

Primary Examiner—Krista Zele
Assistant Examiner—Bing Bui
(74) Attorney, Agent, or Firm—Helfgott & Karas, P.C.

(57) ABSTRACT

The utility of a call waiting service is enhanced. When telephone A is engaged in voice communication with telephone B, if there is a call from telephone C, the telephone number of the telephones B and C are temporarily stored in a CCB. If the telephone C goes on-hook before the telephone B does, the telephone number of the telephone C is transferred from the CCB to subscriber data and stored as a recall number. Thereafter, when a switchhook operation is performed on the telephone A during communication with the telephone B, an automatic call is made to the telephone C by using the stored telephone number. If the telephone B goes on-hook before the telephone C does, the telephone number of the telephone B is transferred from the CCB to the subscriber data and stored as a recall number. Thereafter, when a switchhook operation is performed on the telephone A during communication with the telephone C, an automatic call is made to the telephone B by using the stored telephone number.

14 Claims, 12 Drawing Sheets

METHOD AND APPARATUS FOR CONTROLLING CALL WAITING SERVICE

BACKGROUND OF THE INVENTION

1. Field of the Invention

The present invention relates to a method and apparatus for controlling a call waiting service.

2. Description of the Related Art

In call waiting service, when a telephone A that is provided with a call waiting service is engaged in voice communication with a telephone B, a special ringing tone will be heard from the receiver of the telephone A if a call arrives from a third telephone C. This lets the user of the telephone A know that another telephone is calling. When the user of the telephone A responds by performing a switchhook operation, that is, by briefly depressing the telephone switchhook, the telephone B is placed on hold and the telephone A is connected to the telephone C. Thereafter, when the switchhook is operated again, the telephone C is placed on hold and the telephone A is reconnected to the telephone B.

In such a call waiting service, if the telephone C goes on-hook before the user of the telephone A answers the ringing tone from the telephone C, the problem is that the user of the telephone A does not know who the caller was and, therefore, cannot return the call.

When the user of the telephone A is alerted that a call has arrived from another telephone, the user of the telephone A tells the user of the telephone B, "There's a call from another phone. I'll call you back later," and operates the switchhook to connect to the telephone C before the telephone B goes on-hook or after asking the user of the telephone B to hang up, as is often the case. In such cases, if the user of the telephone A does not know the telephone number of the telephone B and cannot look it up in the telephone directory, he has to ask the remote party to give the number before switching the connection to the new call. On the other hand, in cases where the user makes a return call by finding out the telephone number of the telephone B in the telephone directory or his address book, the problem is that the user has to take the trouble to consult the telephone directory, etc. Further, even when the user remembers the remote party's telephone number, he has to take the time to dial the telephone number anyway.

Also, there often are cases where when a call arrives from the telephone C, the user of the telephone A first operates the switchhook to connect to the telephone C while placing the telephone B on hold, and then reconnects to the telephone B after telling the user of the telephone C, "I'm engaged in another call. I'll call you back later." In such cases also, the same situation as described above for the telephone B occurs for the telephone C.

SUMMARY OF THE INVENTION

It is an object of the present invention to provide a method and apparatus, for controlling a call waiting service, wherein provisions are made to be able to automatically recall the telephone that went on-hook earlier than the other, i.e., the telephone C in the case of the first example, the telephone B in the case of the second example, and the telephone C in the case of the third example.

According to the present invention, there is provided a method for controlling call waiting service between a first telephone that subscribes to the call waiting service, a second telephone that was first connected to the first telephone, and a third telephone that made a call to the first telephone thereafter, comprising the steps of: storing in association with the first telephone the telephone number of the second telephone or the third telephone, whichever went on-hook first; and making an automatic call from the first telephone to the telephone that went on-hook first, by using the stored telephone number.

According to the present invention, there is also provided an apparatus for controlling a call waiting service between a first telephone that subscribes to the call waiting service, a second telephone that was first connected to the first telephone, and a third telephone that made a call to the first telephone thereafter, comprising: means for storing in association with the first telephone the telephone number of the second telephone or the third telephone, whichever went on-hook first; and means for making an automatic call from the first telephone to the telephone that went on-hook first, by using the stored telephone number.

DESCRIPTION OF THE PREFERRED EMBODIMENTS

Figure 1:
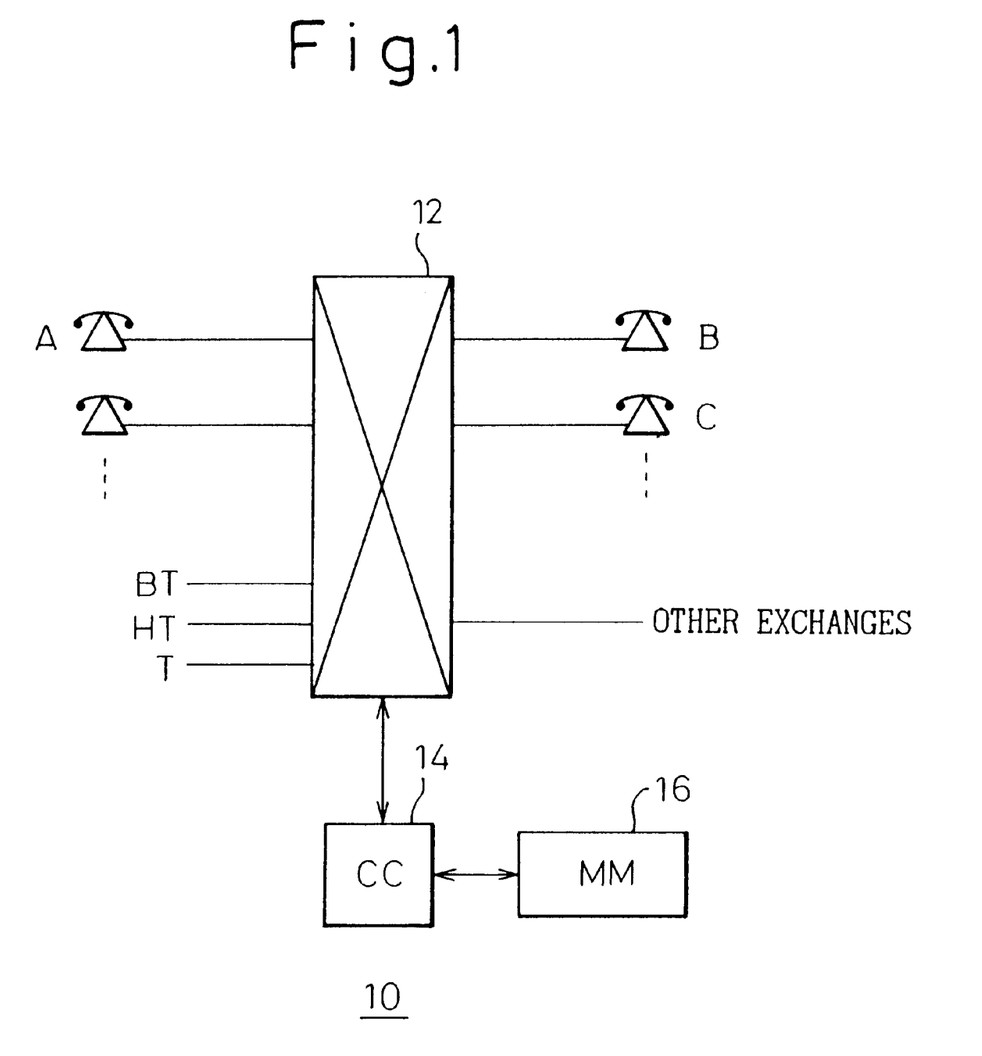
FIG. 1 is a diagram showing the configuration of an exchange to which call waiting service control of the present invention is applied.

FIG. 1 shows the configuration of an exchange 10 to which call waiting service control of the present invention is applied. The exchange 10 includes a network 12, a central control unit (CC) 14, and a main memory 16. A large number of subscriber lines, including the ones accommodating telephones A, B, and C, are connected to the network 12. It is assumed here that at least the telephone A is provided with a call waiting service. To the network 12 are also connected other exchanges as well as devices for generating various tones.

An area for storing subscriber data of each subscriber and an area for storing call control blocks (CCBs) and data necessary for call connections is reserved in the main memory 16. The subscriber data of each subscriber is maintained in the memory, starting from the time that a subscription contract is concluded with the subscriber and a telephone number is assigned, until the contract terminates, and holds records of subscription status of additional services such as call waiting service. A CCB for a given call is maintained in the memory, starting from the time that the. call is initiated, until the call is cleared, and records the status of the telephone during the call (telephone number, serving exchange, connection condition, number, etc.). The main memory 16 also stores programs that the central control unit 14 uses to perform usual control of the exchange and to provide a call waiting service, as well as programs for the call waiting service control of the present invention hereinafter described.

Figure 2:
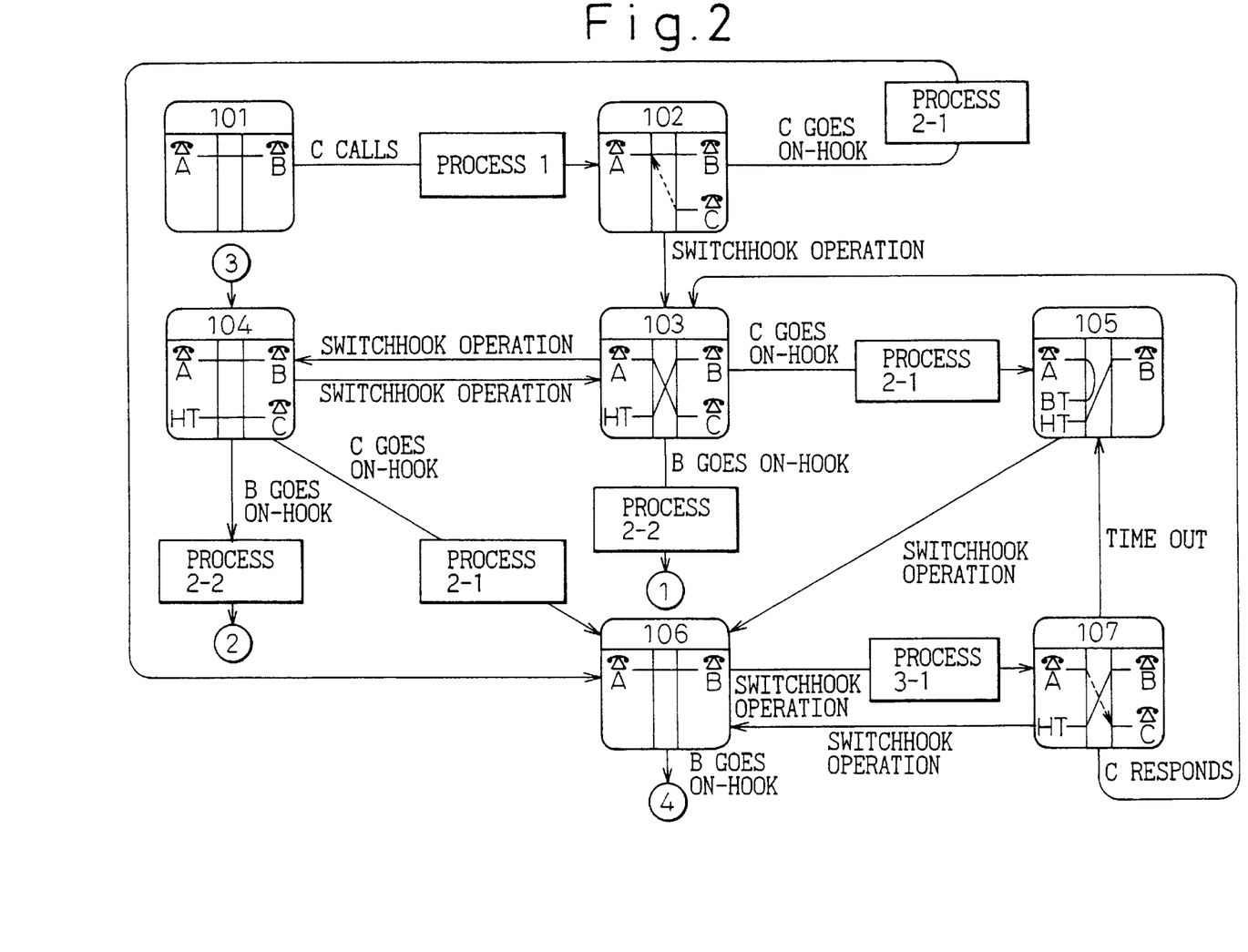
FIG. 2 is a state transition diagram for the call waiting service control of the present invention.
Figure 3:
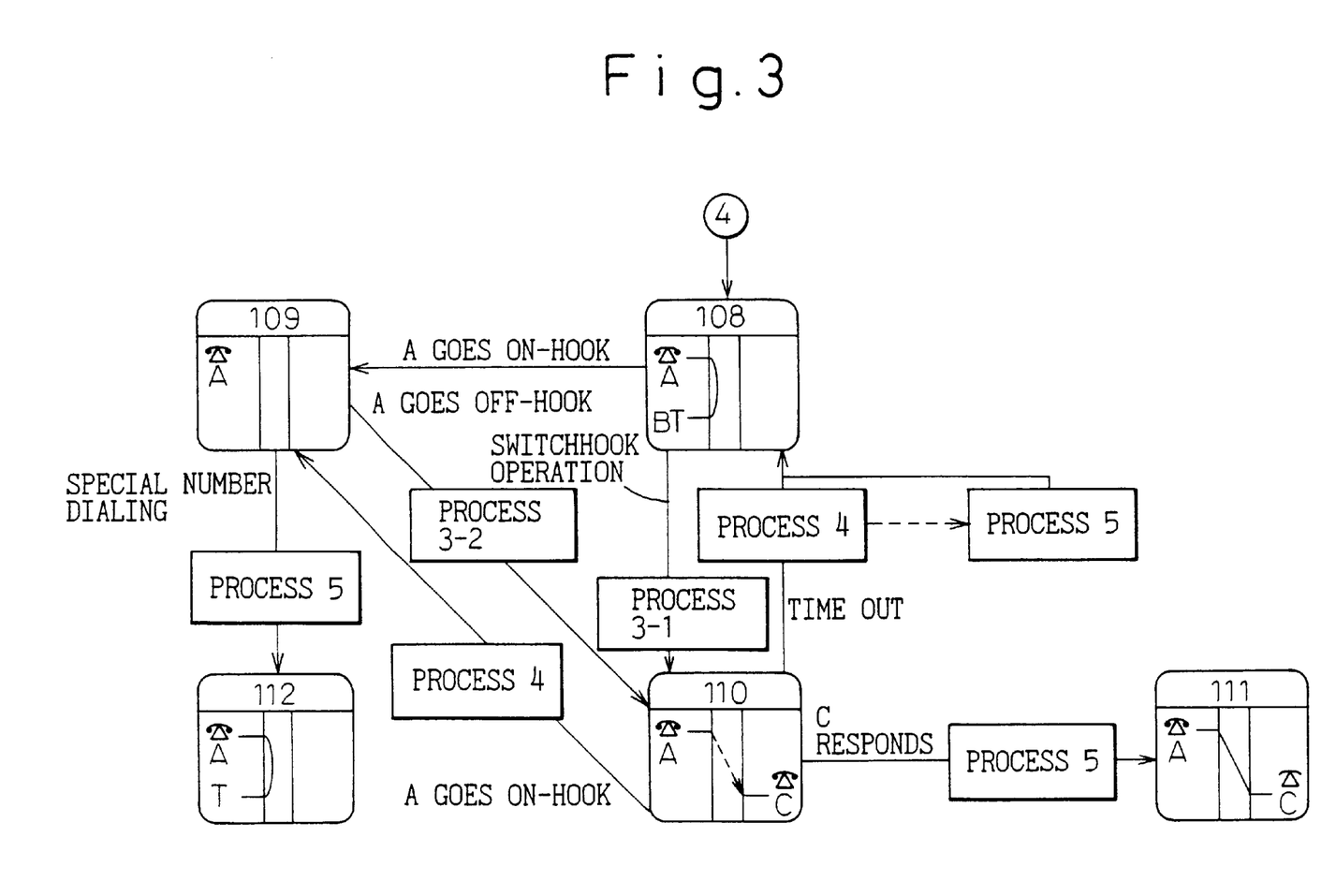
FIG. 3 is a state transition diagram for the call waiting service control of the present invention.
Figure 4:
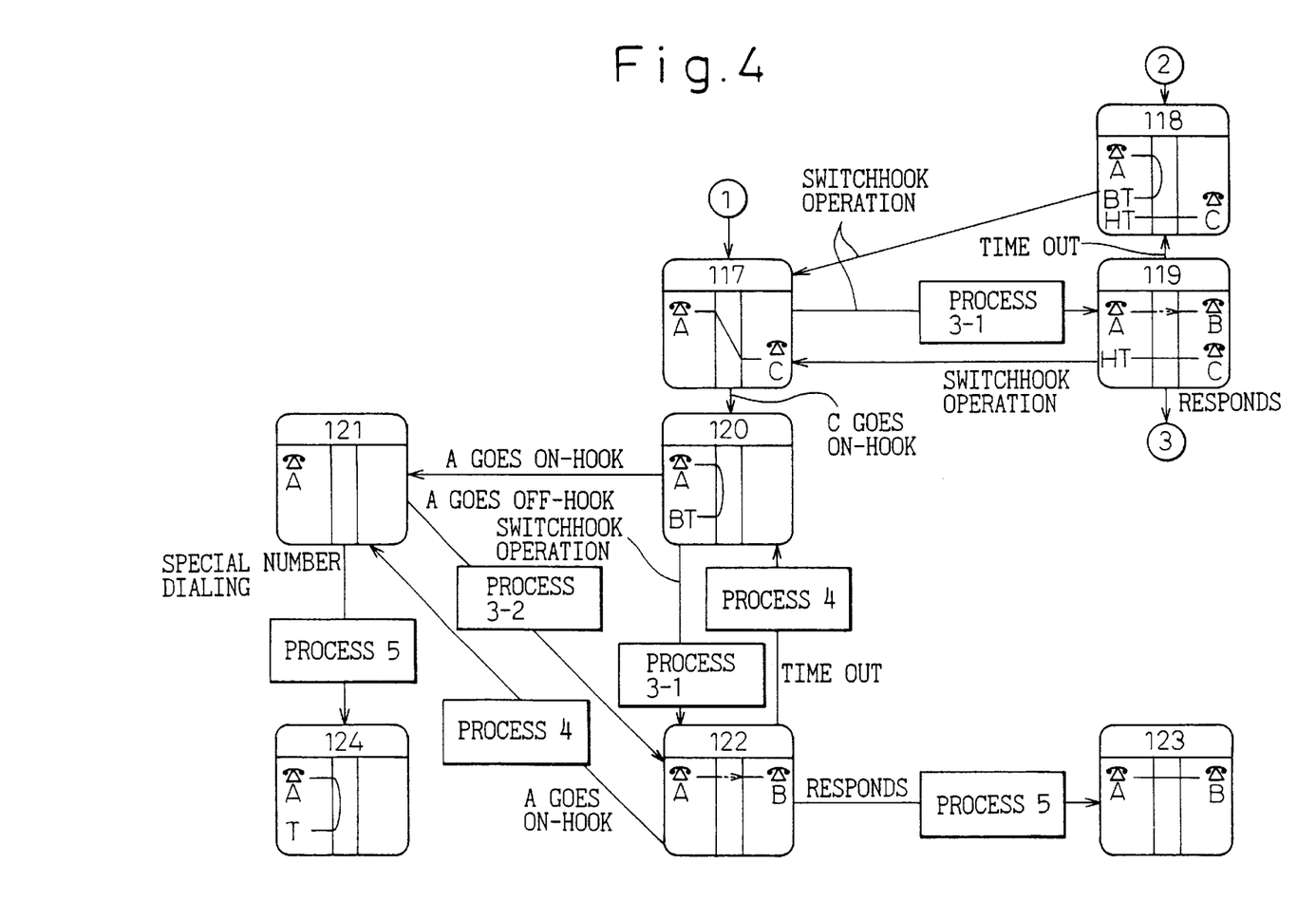
FIG. 4 is a state transition diagram for the call waiting service control of the present invention.

FIGS. 2 to 4 are state transition diagrams for explaining the call waiting service control of the present invention.

Figure 12:
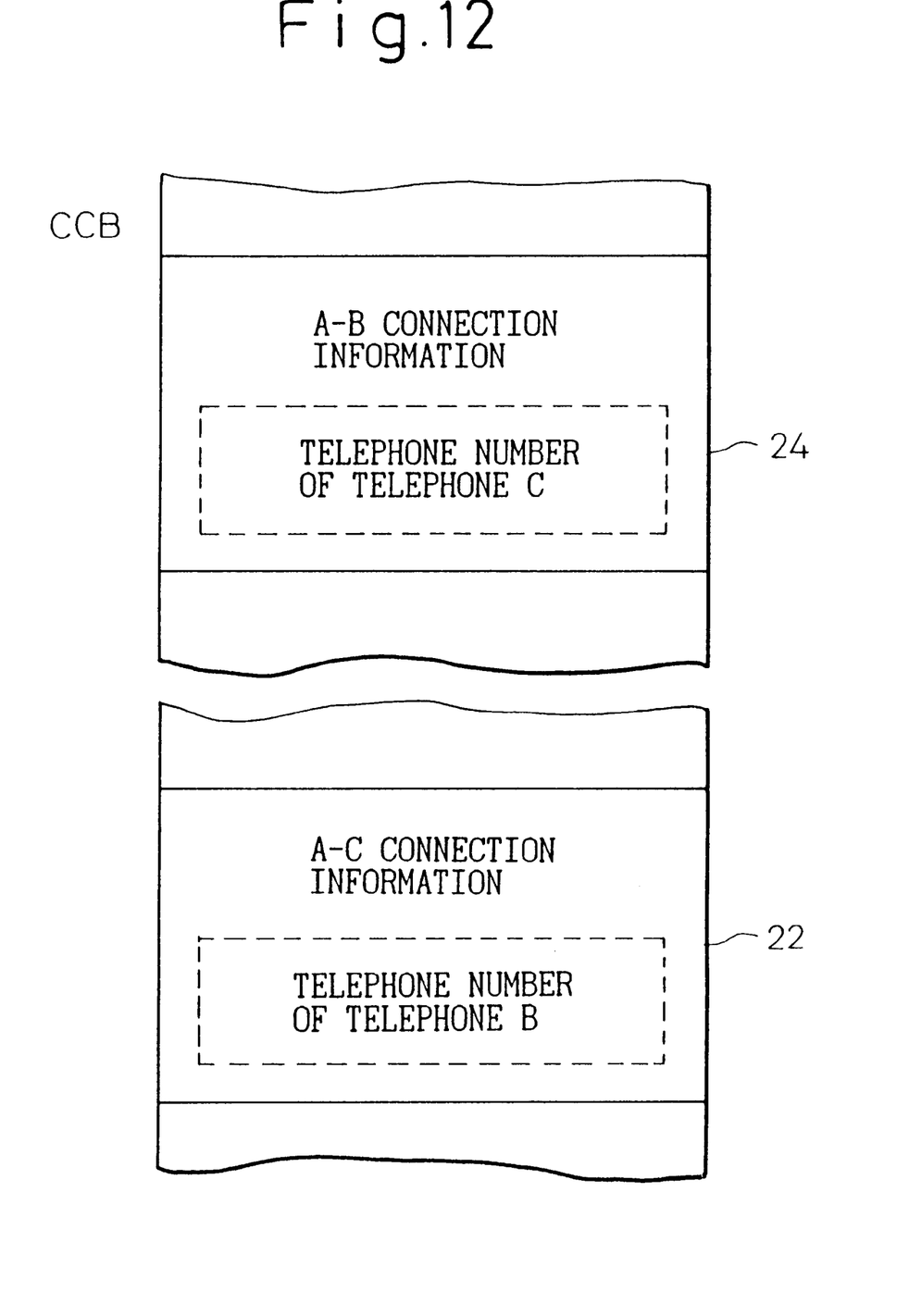
FIG. 12 is a diagram showing call control blocks (CCBs)

First, in state 101 in FIG. 2, the telephone A is connected to the telephone B and engaged in voice communication. When a call to the telephone A arrives from the telephone C, a transition is made to state 102 to notify the telephone A that a new call has arrived from another telephone. During the transition from state 101 to state 102, process 1 (to be described in detail later) is executed by which the telephone numbers of the telephones B and C are temporarily stored in the CCB for connection A–C and the CCB for connection A14 B, respectively (see FIG. 12).

When the user of the telephone A operates the switchhook in state 102, a transition is made to state 103 in which the telephone A is connected to the telephone C and a holding tone is connected to the telephone B. Another operation of the switchhook causes a transition to state 104 where the telephone B is interchanged with the telephone C, and a further operation of the switchhook causes a transition back to state 103.

Figure 13:
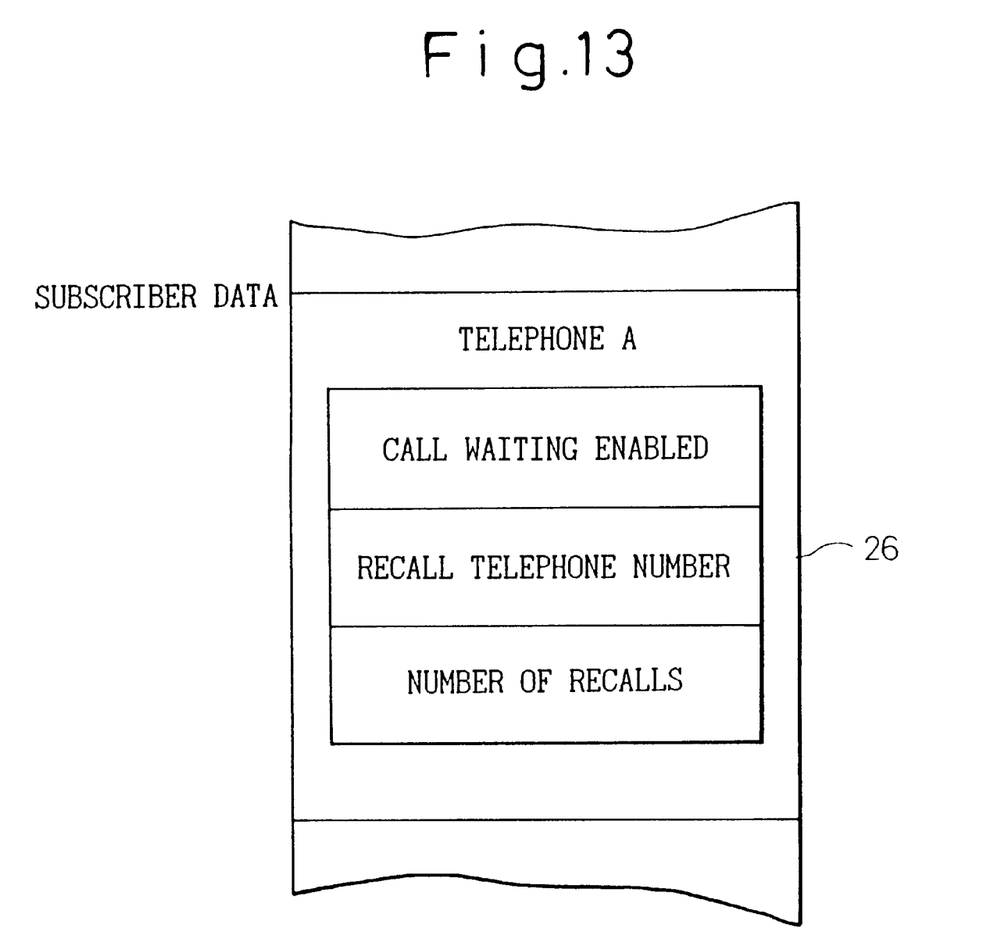
FIG. 13 is a diagram showing subscriber data.

If, in state 104, the user of the telephone C replaces the receiver to go on-hook, a transition is made to state 106 and the telephone C is disconnected. During the transition from state 104 to state 106, process 2-1 (to be described in detail later) is executed by which the telephone number of the telephone C is retrieved from the CCB for connection A-B and is stored as a recall telephone number in the subscriber data of the telephone A (see FIG. 13).

When the switchhook is operated in state 106, a transition is made to state 107 where the holding tone is connected to the telephone B; in the meantime, process 3-1 (to be described in detail later) is executed during the transition and a call is automatically made from the telephone A to the telephone C. If the telephone C answers before a no-answer timer activated thereupon times out, a transition is made back to state 103 and the telephone A is reconnected to the telephone C. If the no-answer timer times out before the telephone C answers, a transition is made to state 105 and a busy tone is connected to the telephone A. In state 105 or state 107, if the switchhook is operated, the telephone A is reconnected to the telephone B, thus returning to state 106.

In state 103, if the active telephone C goes on-hook, a transition is made to state 105; during this transition also, process 2-1 is executed, and the telephone number of the telephone C is retrieved from the CCB for connection A–B and is stored as a recall telephone number in the subscriber data of the telephone A. Process 2-1 is also executed when the telephone C waiting to be answered in state 102 goes on-hook, and the telephone number of the telephone C is stored as a recall telephone number in the subscriber data of the telephone A.

If the telephone B goes on-hook in state 106, a transition is made to state 108 in FIG. 3. In this state, if the user of the telephone A operates the switchhook without replacing the receiver on the hook, process 3-1 is executed to make a transition to state 110 where a call is automatically made to the telephone C. If the no-answer timer activated thereupon times out, a transition is made back to state 108. During that transition, process 4 (to be described later) is executed and the recall count in the subscriber data (FIG. 13) is incremented.

When the user of the telephone A replaces the receiver in state 108, a transition is made to state 109. If the telephone A goes off-hook in state 109, process 3-2, to be described in detail later, is executed. In process 3-2, if no dialing operation is performed for a predetermined time after the off-hook, an automatic call is made from the telephone A to the telephone C by using the stored recall telephone number, and a transition is made to state 110. If the no-answer timer activated in process 3-2 times out, process 4 is executed before returning to state 108; if the recall count incremented in process 4 reaches a predetermined value, process 5 is executed and the recall count and the recall telephone number are erased. When a special number is dialed in state 109, or when the telephone C answers in state 110, process 5 is likewise executed, so that no further recall is made and the memory is ready to store a new recall number.

Turning back to FIG. 2, if the telephone B goes on-hook in state 103, process 2-2 is executed and a transition is made to state 117 in FIG. 4. If the telephone B goes on-hook in state 104 in FIG. 2, process 2-2 is executed and a transition is made to state 118 in FIG. 4. States 117, 118, 119, 120, 121, 122, 123, and 124 in FIG. 4 correspond to states 106, 105, 107, 108, 109, 110, 111, and 112, respectively, in FIGS. 2 and 3, the only difference being that the telephone B is interchanged with the telephone C; therefore, a further description will not be given here.

Figure 5:
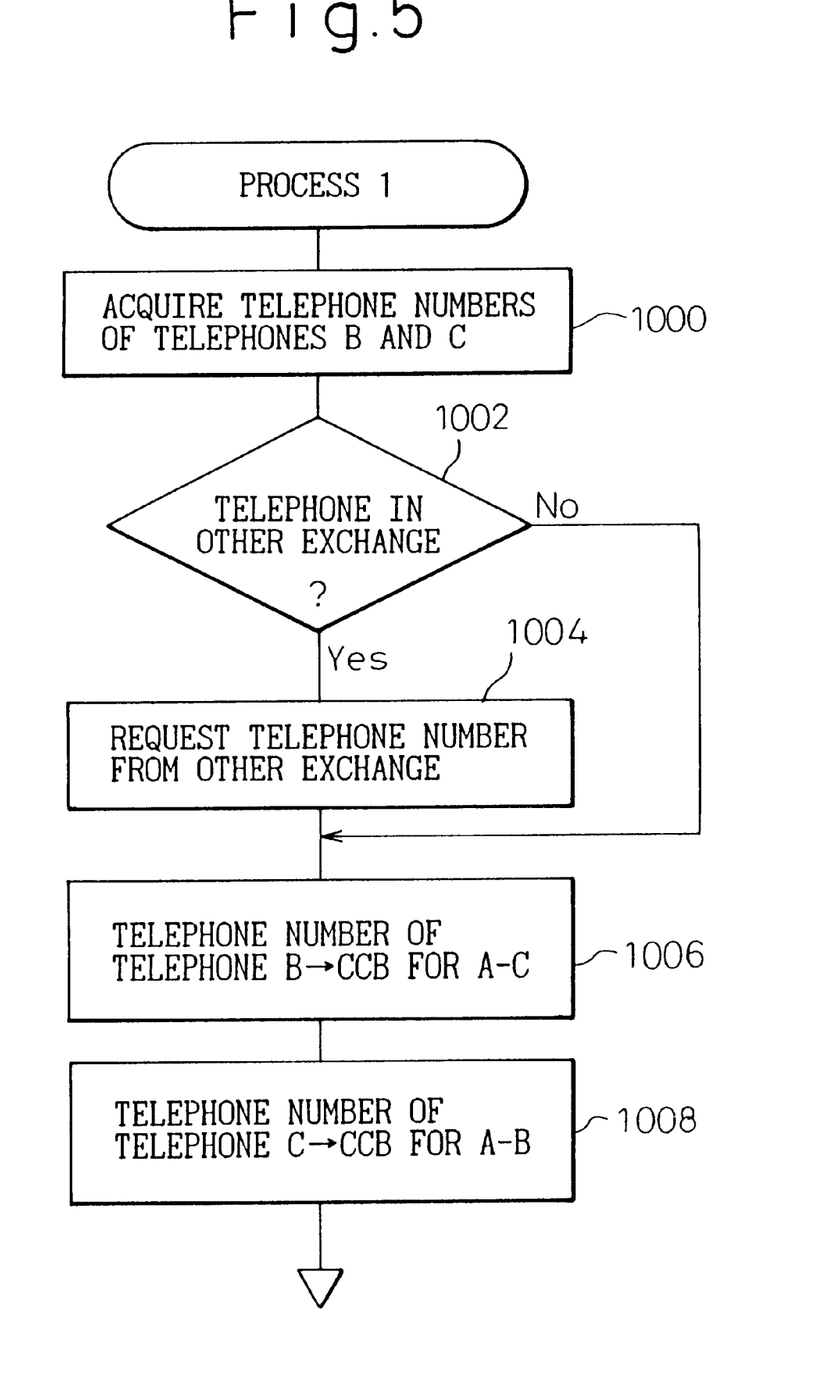
FIG. 5 is a flowchart of process 1.

FIG. 5 is a flowchart illustrating the operation of the CC 14 (FIG. 1) in the above-described process 1. In FIG. 5, first the telephone numbers of the telephones B and C are acquired (step 1000). If any of the telephones is a telephone accommodated in another exchange (step 1002), a request is made to that exchange to transfer the telephone number (step 1004). The acquired telephone number of the telephone B is temporarily stored in the CCB 22 (FIG. 12) that manages the connection between A and C (step 1006), while the telephone number of the telephone C is temporarily stored in the CCB 24 (FIG. 12) that manages the connection between A and B (step 1008).

Figure 6:
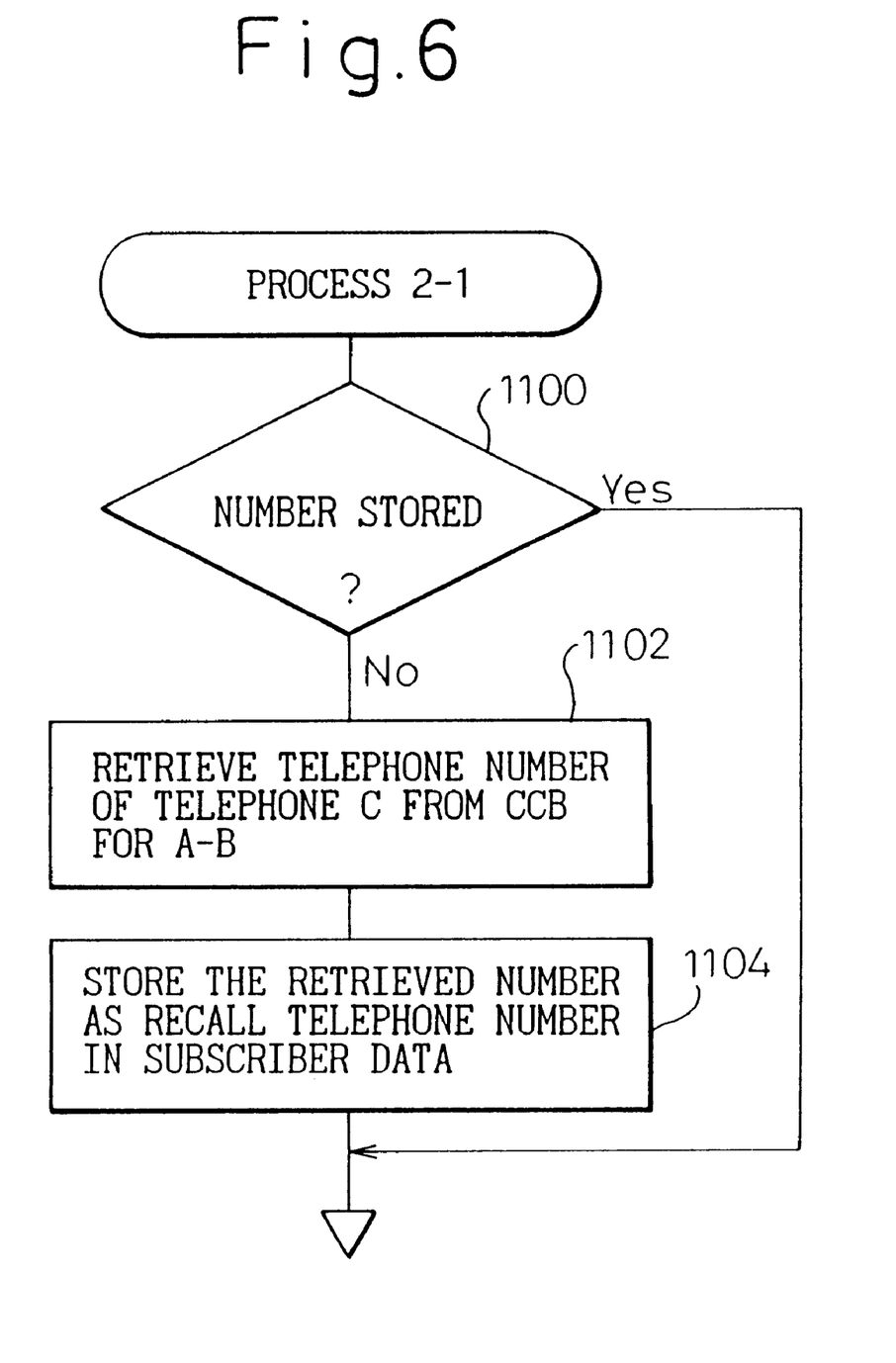
FIG. 6 is a flowchart of process 2-1.

FIG. 6 is a flowchart illustrating the operation of the CC 14 in process 2-1. By referring to the subscriber data 26 (FIG. 13) of the telephone A, it is determined whether a recall telephone number is stored for the telephone A (step 1100); if it is not stored, the telephone number of the telephone C is retrieved from the CCB for connection A–B (step 1102), and is stored as a recall telephone number in the subscriber data (step 1104)

Figure 7:
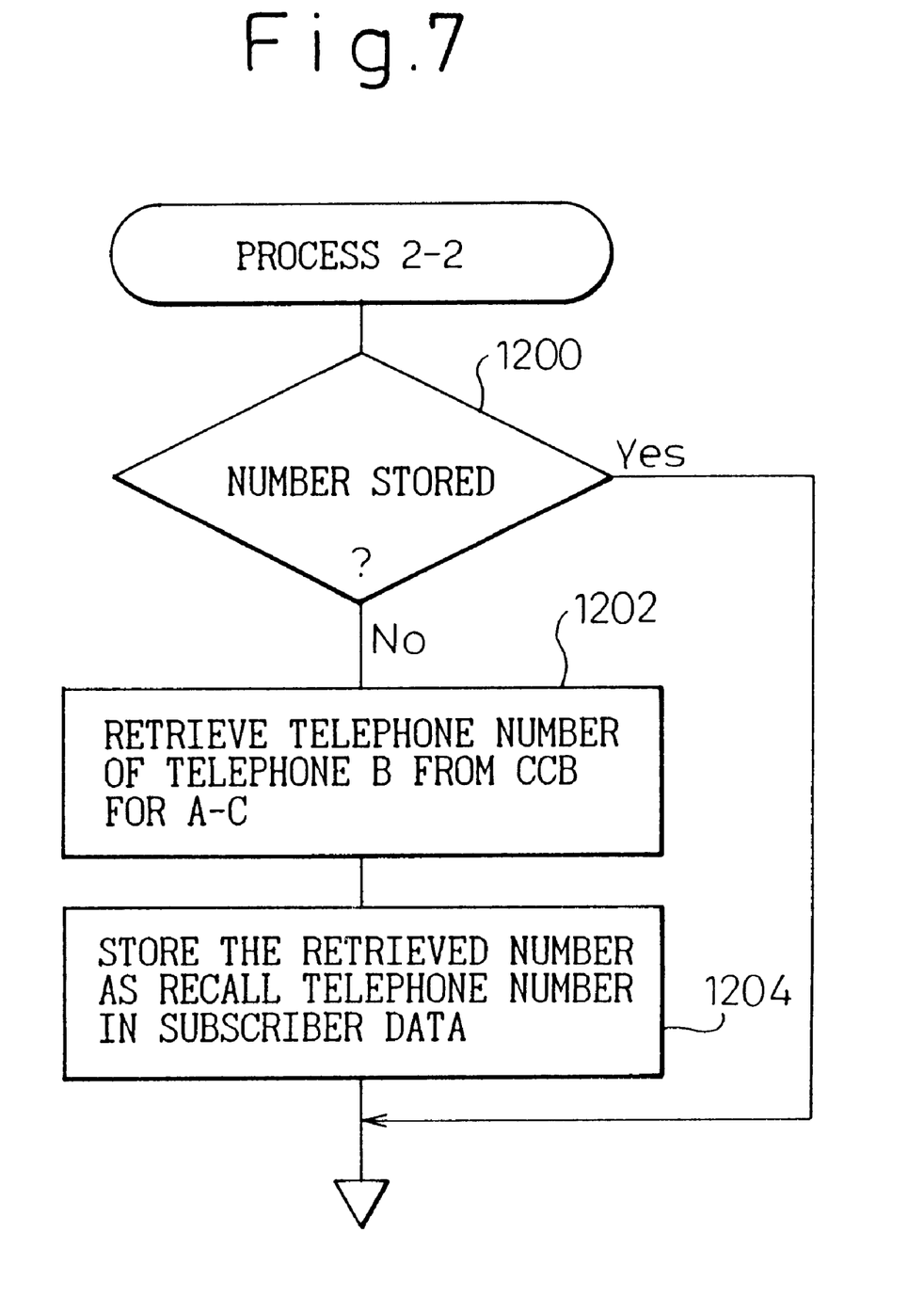
FIG. 7 is a flowchart of process 2-2.

FIG. 7 is a flowchart illustrating the operation of the CC 14 in process 2-2. The operation is the same as that illustrated in FIG. 6, except that the telephone B is interchanged with the telephone C; therefore, the description thereof will be omitted.

Figure 8:
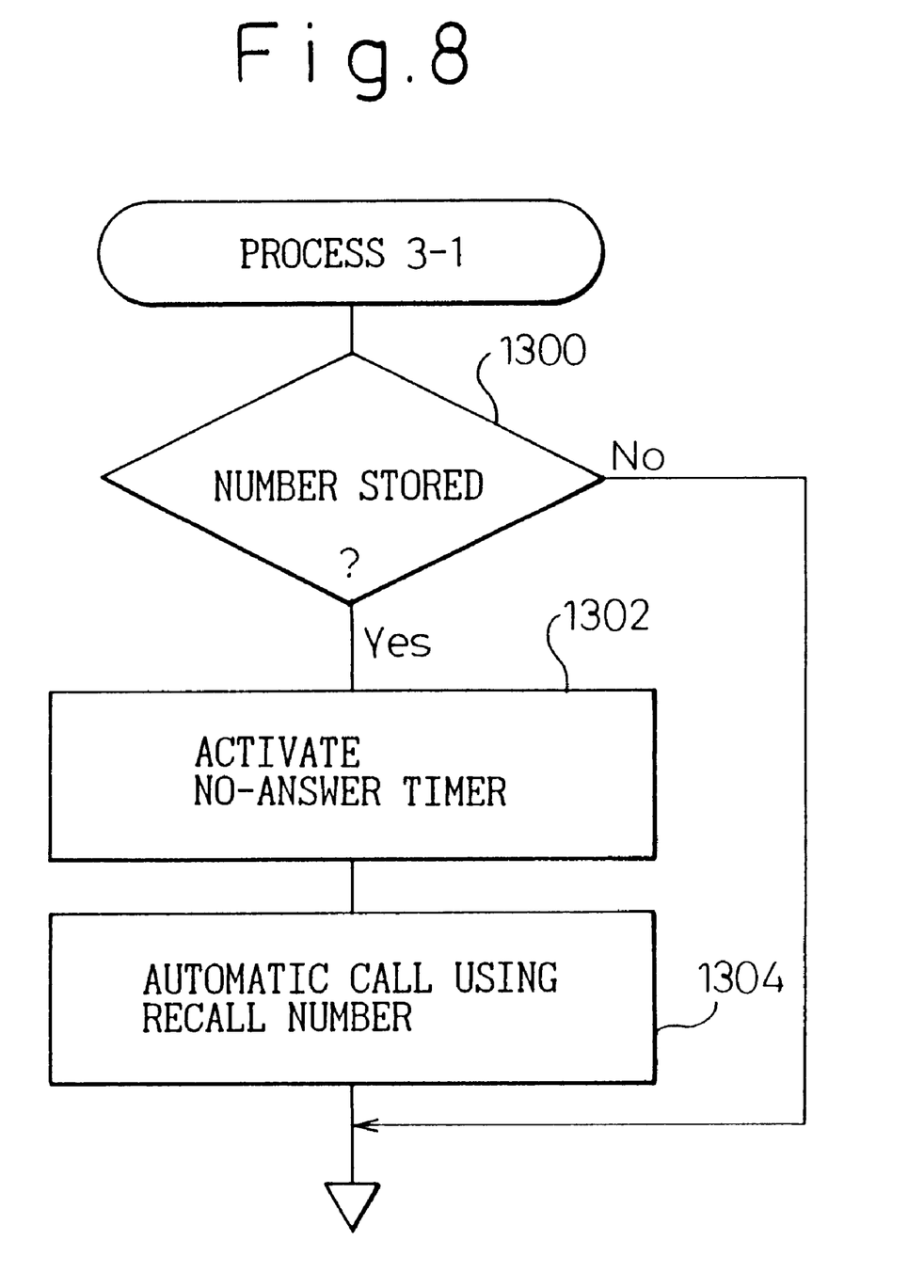
FIG. 8 is a flowchart of process 3-1.

FIG. 8 is a flowchart illustrating the operation of the CC 14 in process 3-1. By referring to the subscriber data, it is determined whether a recall number is stored or not (step 1300); if a recall number is stored, the no-answer timer is activated (step 1302), and a call is automatically made to the telephone C by using the recall number (step 1304).

Figure 9:
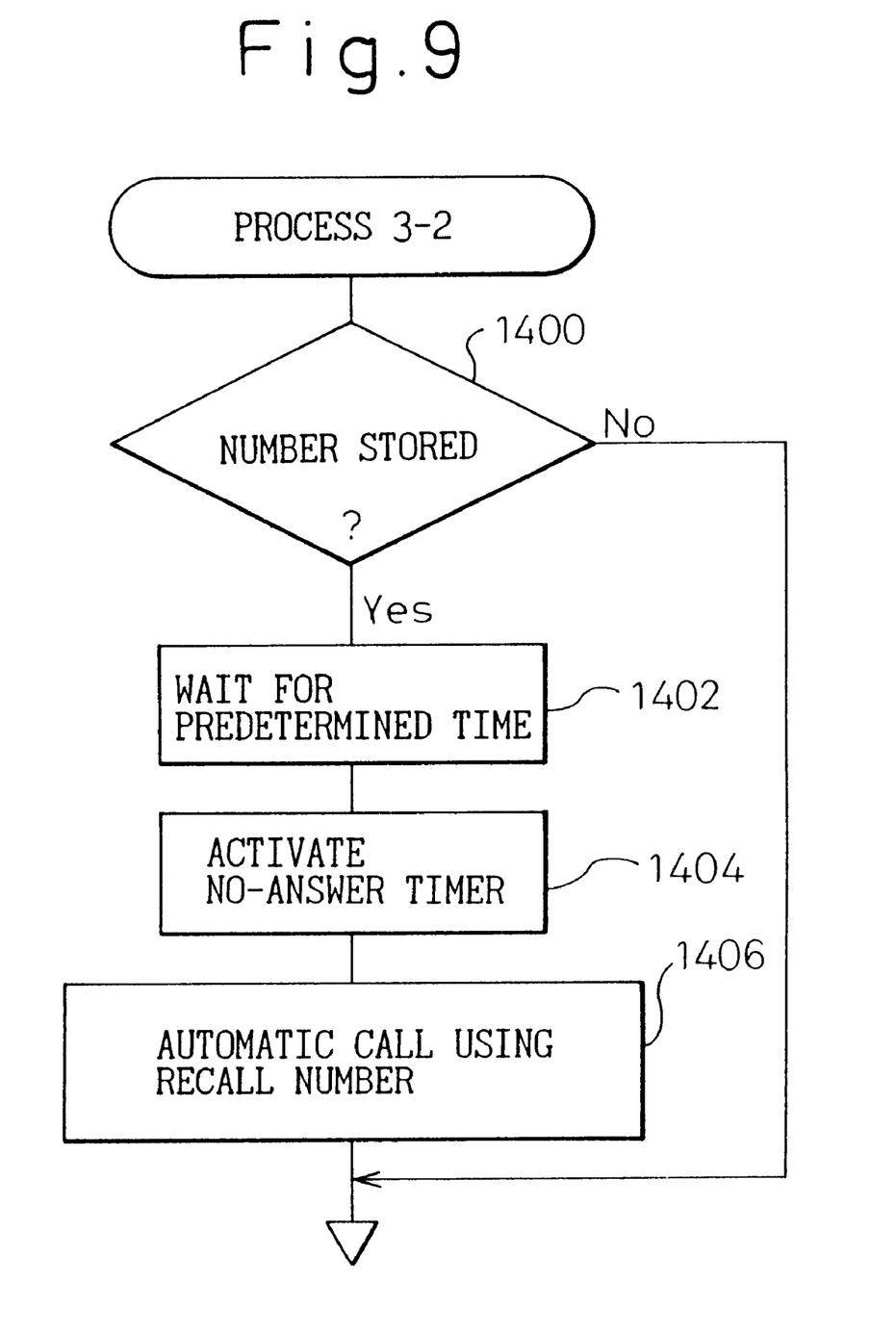
FIG. 9 is a flowchart of process 3-2.

FIG. 9 is a flowchart illustrating the operation in process 3-2. First, it is examined whether a recall number is stored or not (step 1400); if a recall number is stored, the process waits for a predetermined time (step 1402). If the user of the telephone A performs a dialing operation within this time, a call is made to the dialed number. If the predetermined time has elapsed before the user performs a dialing operation, the no-answer timer is activated (step 1404), and an automatic call is made using the recall number (step 1406).

Figure 10:
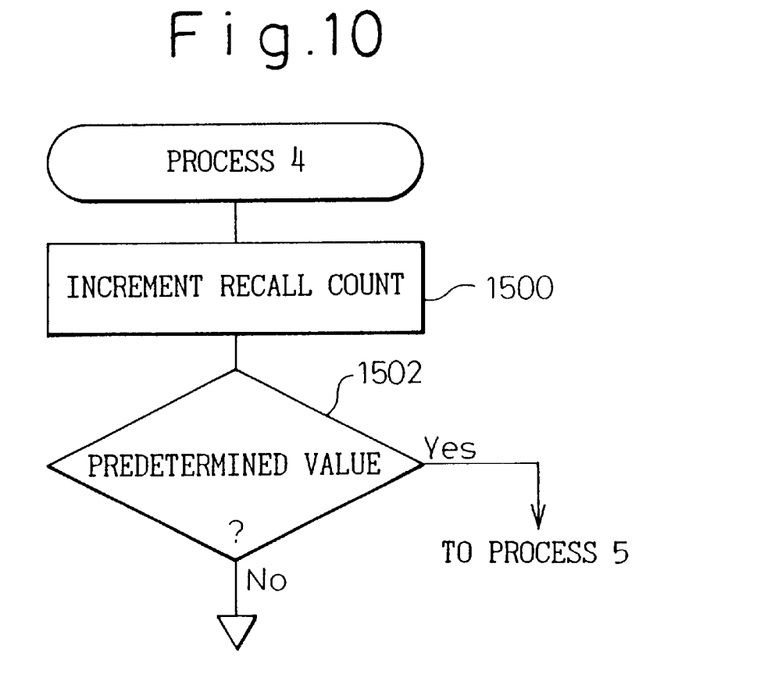
FIG. 10 is a flowchart of process 4.

FIG. 10 shows the flowchart of process 4. The recall count in the subscriber data is incremented (step 1500), and if the recall count reaches a predetermined value, a branch is made to process 5.

Figure 11:
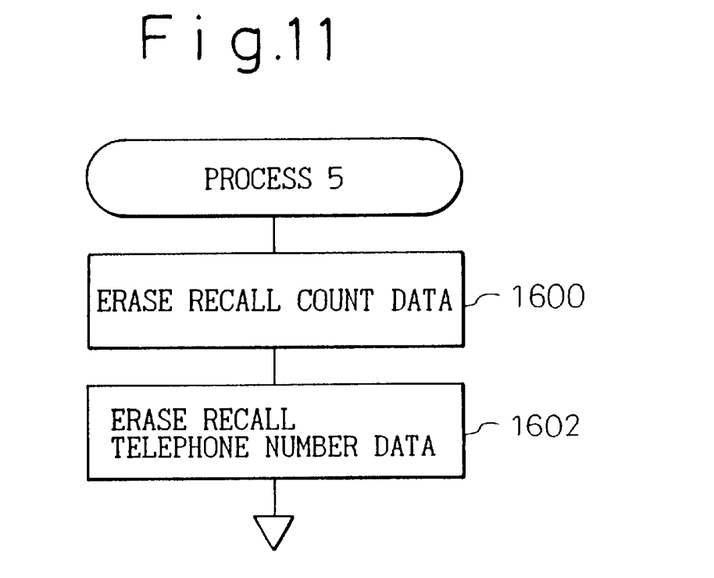
FIG. 11 is a flowchart of process 5.

FIG. 11 shows the flowchart of process 5. In process 5, data of the recall count and recall telephone number in the subscriber data are cleared.

What is claimed is:

1. A method of controlling a call waiting service between a first telephone that is provided with said call waiting service, a second telephone that was first connected to said first telephone, and a third telephone that made a call to said first telephone thereafter, comprising the steps of:

(a) storing in association with said first telephone the telephone number of said second telephone or said third telephone, whichever went on-hook first wherein the first on-hook occurrence is a precondition for the storage of the telephone number; and (b) making an automatic call from said first telephone to the telephone that went on-hook first, by using said stored telephone number.

2. A method according to claim 1, wherein said step (a) includes the substeps of:

(i) storing the telephone numbers of said second and third telephones in a call control block when there is a call from said third telephone; and (ii) transferring the telephone number of said second telephone or said third telephone, whichever went on-hook first, from said call control block into subscriber data of said first telephone.

3. A method according to claim 1, wherein said automatic call in said step (b) is made when a switchhook operation is performed on said first telephone during communication with either one of said second and third telephones after the other of said second and third telephones went on-hook.

4. A method according to claim 1, wherein said automatic call in said step (b) is made when a switchhook operation is performed on said first telephone subsequently to the end of communication with either one of said second and third telephones after the other of said second and third telephones went on-hook.

5. A method according to claim 1, wherein said automatic call in said step (b) is made when said first telephone has gone off-hook after once going on-hook subsequently to the end of communication with either one of said second and third telephones after the other of said second and third telephones went on-hook.

6. A method according to claim 5, further comprising the step of disabling said stored telephone number when a specific number is dialed immediately following said off-hook operation initiated after said on-hook operation.

7. A method according to claim 5, further comprising the steps of:

counting the number of automatic calls made in said step (b); and disabling said stored telephone number when the number of automatic calls has reached a predetermined number.

8. An apparatus for controlling a call waiting service between a first telephone that is provided with said call waiting service, a second telephone that was first connected to said first telephone, and a third telephone that made a call to said first telephone thereafter, comprising:

means for storing in association with said first telephone the telephone number of said second telephone or said third telephone, whichever went on-hook first wherein the first on-hook occurrence is a precondition for the storage of the telephone number; and means for making an automatic call from said first telephone to the telephone that went on-hook first, by using said stored telephone number.

9. An apparatus according to claim 8, wherein said storing means includes:

means for storing the telephone numbers of said second and third telephones in a call control block when there is a call from said third telephone; and means for transferring the telephone number of said second telephone or said third telephone, whichever went on-hook first, from said call control block into subscriber data of said first telephone.

10. An apparatus according to claim 8, wherein said automatic calling means makes said automatic call when a switchhook operation is performed on said first telephone during communication with either one of said second and third telephones after the other of said second and third telephones went on-hook.

11. An apparatus according to claim 8, wherein said automatic calling means makes said automatic call when a switchhook operation is performed on said first telephone subsequent to the end of communication with either one of said second and third telephones after the other of said second and third telephones went on-hook.

12. An apparatus according to claim 8, wherein said automatic calling means makes said automatic call when said first telephone has gone off-hook after once going on-hook subsequent to the end of communication with either one of said second and third telephones after the other of said second and third telephones went on-hook.

13. An apparatus according to claim 12, further comprising means for disabling said stored telephone number when a specific number is dialed immediately following said off-hook operation initiated after said on-hook operation.

14. An apparatus according to claim 12, further comprising:

means for counting the number of automatic calls made by said automatic calling means; and means for disabling said stored telephone number when the number of automatic calls has reached a predetermined number.

* * * * *